W. C. SMITH.
APPARATUS FOR ATTACHING HARNESS TO THE SHAFTS.

No. 191,081. Patented May 22, 1877.

WITNESSES:
E. Wolff.
J. H. Scarborough.

INVENTOR:
W. C. Smith
BY
ATTORNEYS.

UNITED STATES PATENT OFFICE.

WILLIAM C. SMITH, OF NEW HAVEN, CONNECTICUT.

IMPROVEMENT IN APPARATUS FOR ATTACHING HARNESS TO THE SHAFTS.

Specification forming part of Letters Patent No. 191,081, dated May 22, 1877; application filed March 24, 1877.

*To all whom it may concern:*

Figure 1:
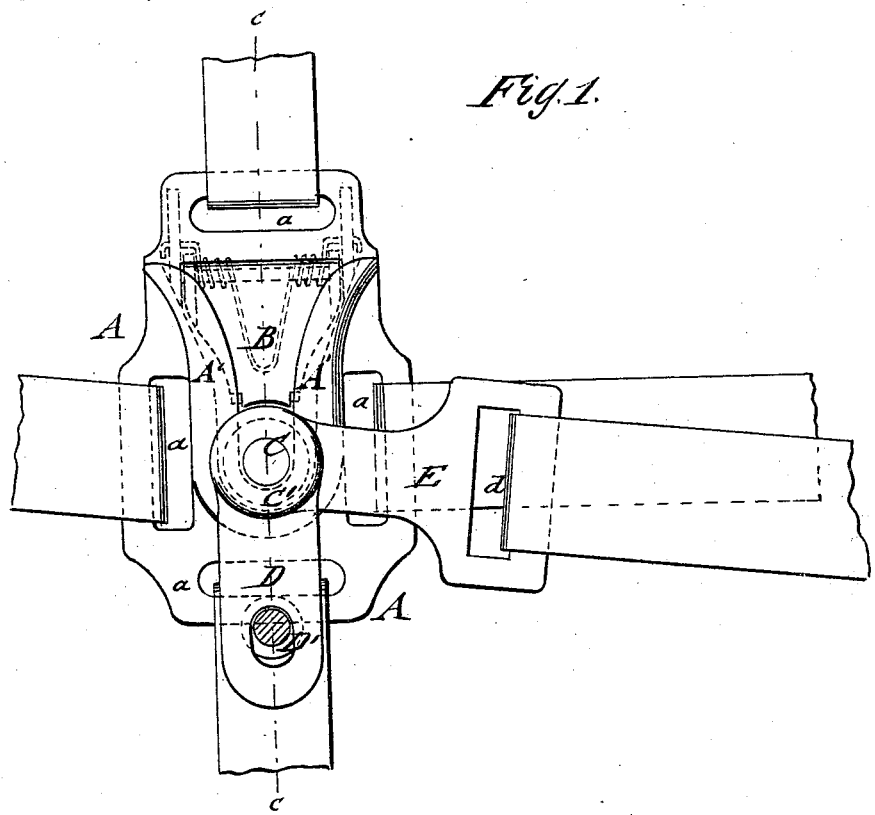
Figure 2:
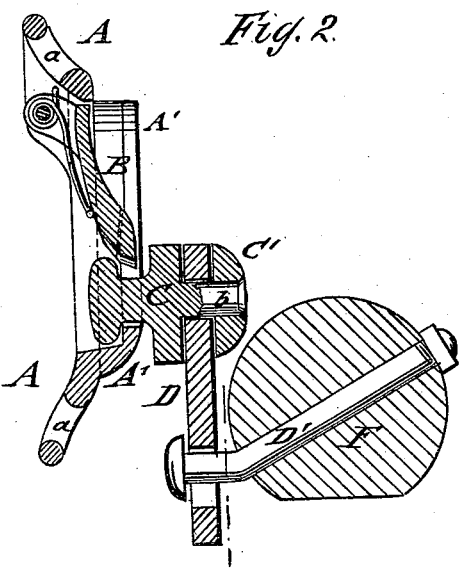

Be it known that I, WILLIAM C. SMITH, of New Haven, in the county of New Haven and State of Connecticut, have invented a new and Improved Device for Hitching Shafts to Harness, of which the following is a specification:

In the accompanying drawing, Figure 1 represents a side view of my improved shaft-hitching device, and Fig. 2 is a vertical transverse section of the same on line $c\ c$, Fig. 1.

Similar letters of reference indicate corresponding parts.

This invention is intended for the purpose of hitching quickly a single horse to any vehicle having shafts, or for hitching a double team, using two pairs of shafts, instead of a pole, the object of the device being to save time, so as to be specially adapted for hose-carts, fire-engines, and similar apparatus.

The invention consists of a socket, with open top and spring-acted locking-dog, applied to the harness, and of a button that enters the socket and is connected by loosely-swinging link and trace-piece to the shaft and trace.

In the drawing, A represents a plate that is attached by four side loops, $a$, to the harness—namely, by the top loop to the saddle, by a front loop to a short trace, extending to the hames, by a rear loop to a strap, running back to the breeching-strap, and by a bottom loop to a belly-girth. The plate A carries a socket, A', that is open and spreading at the top, and provided with a spring-acted dog, B, that is hinged below the top slot of plate A, and made with tapering end, that fits closely into the open top part of the socket, so as to close the same in reliable manner. A button, C, is cast in one piece, with a trace-piece, E, and applied by a center stud, $b$, with head C', to a swinging link, D, that is hung by its lower slotted end loosely to the headed end of a bolt, D', passing from the outside to the inside of the shaft F. The trace-piece E extends backward, and is attached by an end loop, $d$, to the trace running back to the whiffletree. The trace is hung, by piece E and link D, to the shaft, in readiness to be hitched with the shaft to the harness, which is accomplished by the button C of the trace-piece, that passes, when the shafts are lowered, along the sides of the harnessed horse, and along the dog B, pressing the same back and entering socket A'. The dog B closes instantly over the button and locks it thereby in reliable manner into the socket, without any chance of getting detached, so as to furnish thus a quick and reliable hitching device for the horses and vehicles of fire-departments, by which the horse may be hitched almost simultaneously at both sides by the mere lowering of the shafts, and the vehicles rapidly started to their point of destination.

Having thus described my invention, I claim as new, and desire to secure by Letters Patent—

1. The combination, with a socket and locking spring-dog attached to the harness, of a button connecting with a trace and the shaft of a vehicle, as shown, for the purpose and in the manner set forth.

2. The combination of a socket, having open and spreading top part, and a hinged and spring-acted dog, fitting into the open part, with a hitching-button, of a trace-jointing piece, and with a loose pivot-link of the shaft, substantially in the manner specified.

3. The combination of trace-jointing piece E, having button C, stud $b$, and head C', with loosely turning and swinging link D, and bolt D', of shaft, to form connection of shaft and trace ready for hitching, substantially as set forth.

WILLIAM CLEMENTS SMITH.

Witnesses:
GEO. BLAKEMAN,
CLARK BUCKINGHAM.